Figure 1:
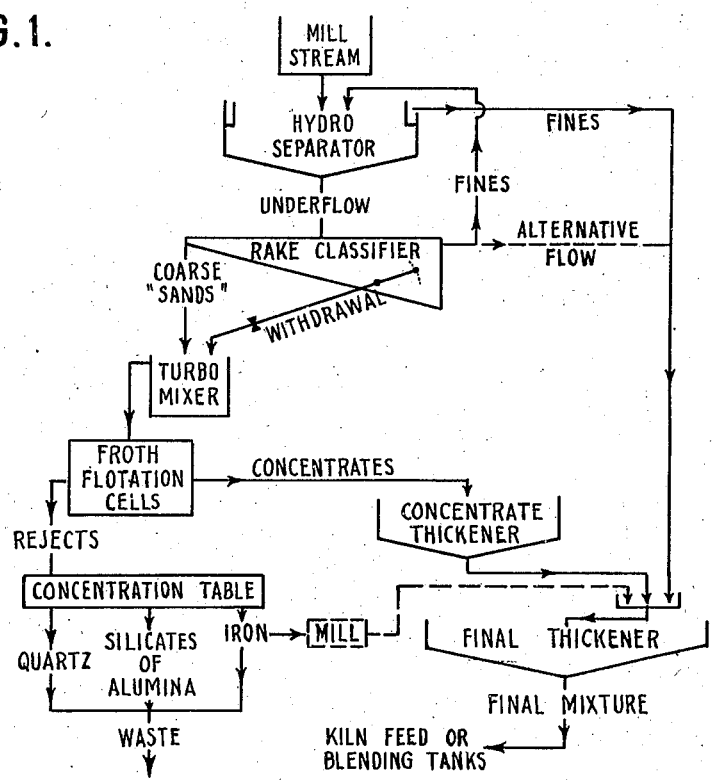

Jan. 21, 1936.   C. H. BREERWOOD   2,028,313
MANUFACTURE OF CEMENT
Filed July 24, 1934

INVENTOR
C. H. BREERWOOD.
BY
ATTORNEYS

Patented Jan. 21, 1936

2,028,313

UNITED STATES PATENT OFFICE 2,028,313

MANUFACTURE OF CEMENT

Charles H. Breerwood, Narberth, Pa., assignor to Valley Forge Cement Company, a corporation of Pennsylvania Application July 24, 1934, Serial No. 736,664

11 Claims. (Cl. 106—25)

This invention relates to the manufacture of cement, especially Portland cement, its modifications and special cements in which compounds of calcium and silica are the principal constituents. It has to do with the treatment of inferior cement raw materials to segregate the constituents thereof, whereby excessive quantities or an undesirable form or both of one or more of the constituents can be eliminated, and an ultimate mixture can be produced both chemically and physically especially suitable for burning to clinker, and without adding correctives obtained from another source, or without adding any corrective in uneconomical quantities.

The new method has substantially the same purposes as those disclosed in my Patent No. 1,931,921, with the addition that it is a specific purpose of this invention to provide the cement chemist with a convenient and economical means to treat the raw materials continuously as they are received from time to time, and regardless of their variation in analysis to derive likewise continuously, a final mixture of a constant, desired analysis. This product may and normally will be the ultimate analysis desired for burning, but it is also possible to employ the method to produce quantities of material which may be mixed with other quantities similarly prepared or with natural materials or material components to arrive at the ultimate desired composition.

It is a further purpose to simplify the operation of grinding, within limits to be explained hereinafter, whereby the same degree of relatively coarse grinding will serve to cover a fairly wide range of analysis variation in the available raw materials, and will result in a finer final product, for example within the ranges suitable for burning to clinker. These products are also more nearly uniform in fineness and contain less of the coarser quantities than those resulting from conventional grinding methods.

The new method may, therefore, be considered as a continuous method of controlling the treatment of materials which vary in analysis as received, for the purpose of correcting both the proportions and ratios, to avoid preliminary blending prior to grinding and likewise to avoid blending before burning, excepting when the nature of the materials treated makes it more economical to prepare quantities of materials departing from the desired ultimate composition in order to avoid waste of quantities of useful constituents or the complete treatment of an excessive tonnage.

Another advantage of the new method has to do with considerably simplified quarry operation. As limestone deposits usually vary widely in analysis even in the same quarry and the variation between adjacent strata may be abrupt, it has ordinarily been necessary heretofore to exercise considerable care in the selection of the rock. This also makes it usually necessary to take materials from two or more locations at the same time.

In contrast, the new method has enabled me to quarry inferior argillaceous limestones substantially without regard to these variations as they are reached in the development of the quarry face, and to process them to derive an ultimate composition continuously without mixing and blending. At the cement mill at which I am now practicing this invention commercially on materials including those referred to in detail hereinafter, this simplified procedure has resulted in quarry savings alone ranging from two thousand to three thousand dollars a month.

The inferior cement raw materials contemplated herein include argillaceous limestones and cement rocks, and the lime-bearing components of two-component mixtures. As argillaceous limestones or cement rocks are the most complex materials employed in the cement industry, in that they include quantities of each of the four essential constituents, and as at least two of the constituents occur in several forms, the description of the new method will be substantially limited for brevity to the treatment of these argillaceous limestones. Further, as cement chemists are generally familiar with these materials, the use of a typical specimen as an example will enable chemists to understand and apply the process to similar stones, as well as those of simpler composition, such as the lime component of a two-component mixture.

The description will also be substantially limited to the preparation of a normal Portland cement mixture of correct proportions and ratios and the calcium content will, for simplicity, be used as the constant or standard of comparison to illustrate how the final analysis can be maintained continuously, regardless of the variation in calcium carbonate in the materials received from time to time for treatment.

It will be understood, however, that the treatment as described may be extended to control each of the constituents and may be varied at will to produce mixtures suitable for the preparation of other cements, or quantities of material of other than the standard analysis given. As silica and alumina are the constituents generally occurring in excess, and as either or both of these may also be present in undesirable forms, the elimination of these excesses of silica and alumina will be described particularly, and emphasis will be placed on the elimination of both excessive quantities of silica and uncombinable forms such as relatively coarse quantities of quartz, chert and flint.

In the example to be given, the control features will be described by reference to the elimination of the necessary quantity of silica to result in a final mixture of a desired calcium carbonate value, but it will be realized that if alumina is the constituent requiring close control, the relative quantities of the treated and untreated parts may be similarly varied by reference to the variation in alumina content in the original materials. The control features are, however, elastic and quantities of both silica and alumina may be eliminated at the same time.

As described in my patent, above referred to, I have found that coarse quartz particles fail to react favorably in the process of burning to clinker, and it is my opinion that any such particles that will be retained in a 325 mesh sieve should arbitrarily be discarded. The original materials are ground, however, to a degree such that these quartz particles will not represent the total quantity of the excess silica, as it is one of the primary control features of the present method to add a variable quantity of intermediate sizes to them.

To this end I prefer to segregate or classify the particles whereby that part of the total quantity which will not be treated by froth flotation will be of a degree of fineness preferably passing through a 325 mesh sieve, although this degree is not arbitrary. The part to be treated will include all of the particles coarser than 325 mesh fineness, plus the addition of a sufficient quantity of the relatively coarser products which pass a 325 mesh sieve, whereby the treatment and concentration of this second part will permit the elimination of a sufficient quantity of silica to provide for a constant final analysis when the untreated fine particles are combined with the treated coarser particles. This practice not only results in a complete correction of the proportions and ratios, as explained above, but also yields a product especially suitable with reference to the physical sizes of the particles.

In accomplishing the complete purposes of the method, to provide for a continuous correction of both the physical and chemical analyses, with sufficient rapidity to avoid errors, preliminary grinding should also be carried out to a degree that the final mixture is favorable for burning, after the excess silica has been discarded. To make this clear, by example, a material of similar physical characteristics to that described in detail hereinafter, required reduction to not less than 90% through the 200 mesh sieve in order to produce good, commercial cement. By making the chemical correction by the present method, an original reduction to 85% results in a final mixture ranging from 90% to 92% through the 200 mesh sieve, owing to the elimination of the coarser quartz particles. It will be apparent that this mixture will react more readily than that first mentioned since all of the quartz over 325 mesh sieve size together with some of the coarser of the intermediate sizes has been removed, and the kiln reactions will be uniform and complete.

In general the new method, as applied to wet process cement manufacture for example, comprises the division or splitting of the total quantity of material into two parts, the relative proportions of which are varied inversely as the calcium carbonate value varies. The fine particles which are not further treated except by de-watering to normal slurry moisture content are not changed materially in analysis, or at least they are not changed to a degree that will permit burning to clinker.

The coarse particles are treated by froth flotation in one or more stages, the treatment being so regulated that the concentrate will have a substantially fixed or constant calcium carbonate value. This value is maintained by proportioning the quantities of reagents in accordance with the quantities of materials delivered to the cells, as described more fully hereinafter. By so operating the flotation cells to produce this constant value, variation in the relative tonnage treated results in a mixture of constant calcium carbonate value when the concentrates are combined with untreated fines.

It should not be understood from the above that the quantities so segregated for treatment are inversely proportional to the calcium carbonate value, as several factors cause a departure from direct progression. The most important of these are first the results of the variations in analysis between the segregated fine and the coarse particles, and their variation from the original total analysis; second, the purity or degree of concentration or calcium carbonate segregation desired and the quantity to be wasted, which for convenience may be constant values, as explained hereinafter; and third, the variable weight recoveries. In order that the quantity to be treated may be determined exactly a formula will be explained hereinafter, in which other factors necessary to satisfy various conditions of capacity and calcium carbonate values may be substituted, to permit an exact practice adaptable to other local conditions.

Figure 2:
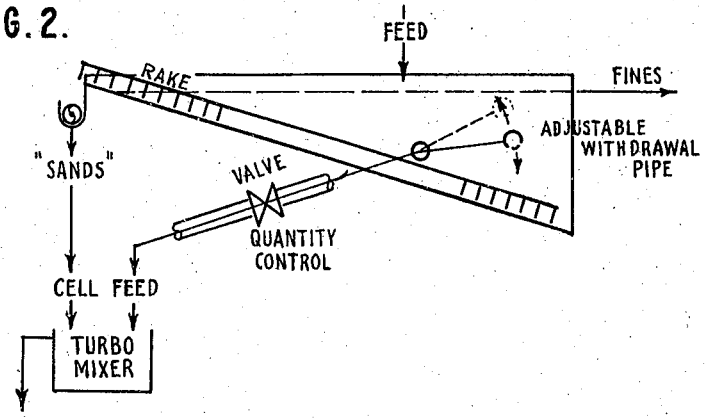

For a better understanding of the invention, reference is made to the accompanying drawing, in which:

Fig. 1 is a typical flow diagram, in which the dotted lines indicate alternative flows, and Fig. 2 is a detail of the preferred means to control the relative quantity of the materials subjected to froth flotation.

Referring to the drawing, and first to Fig. 1, it will be understood that the raw materials to be treated have been ground to a fineness such that substantially all of the constituents have been released from their physical bonds, and the final product will be suitable for burning. In the specimens to be discussed hereinafter, this has been accomplished with one exception to be explained, at a fineness of about 85% passing through a 200 mesh sieve. It is also the purpose to process raw materials which vary in analysis from time to time as received for treatment, and the example is also based upon the idea of producing an ultimate Portland cement mixture having a calcium carbonate value corresponding to the common standard of 75.8%, and during the treatment to establish a fixed concentrate value of 87% calcium carbonate. These values are not arbitrary, but I have found them especially convenient in actual service and they also serve to illustrate the precise control that may be had in the practice of the new method.

The raw slurry or mill stream is first diluted to a degree at which classification according to particle sizes can be carried out with accuracy. The preliminary division to provide the quantities of material to form the "treated" and "untreated" parts may be made in a hydro-separator or bowl classifier, so arranged that the overflow is of a fineness not coarser than 325 mesh size. These fine products are not treated further, excepting to decrease the water content and to combine them with the concentrates to be discussed hereinafter. As the desired accuracy in classification cannot usually be made in a single stage of classification, I prefer to discharge the underflow from this separator into an additional classifier such as one of the rake type to complete the desired recovery of fines and separation of the two parts.

Within the rake classifier the coarse particles, sometimes called "sands", readily precipitate to the inclined floor of the rake box, from which they are recovered by the rake elements. Corresponding to the degree of dilution and agitation, the remaining particles of relatively finer sizes are suspended at various levels, and are more or less stratified in accordance with fineness, as the rate of settling obviously increases according to increases in particle sizes. Therefore, the fine materials which were not completely separated in the hydro-separator may be recovered from the rake classifier as overflow, and either combined directly with the fines previously removed, or sent back to the hydro-separator to decrease the possibility of adding relatively coarse particles to the fines. The underflow, or sands, include the uncombinable quartzes, which must be eliminated to provide for the most favorable clinkering reactions. In addition, however, they contain calcium values that must be recovered, not only to correct the mixture but to avoid waste of this valuable constituent.

The rock specimen to be discussed hereinafter is one in which the argillaceous compounds are naturally comparatively fine, and also grind more easily than the calcium carbonate, with the result that the sands are actually higher in calcium value than the original slurry. In some instances I have found that the calcium value may be increased substantially to the desired composition, but these sands are unsuitable, as they are not ground finely enough to react in the kiln, as will be apparent from the above description.

If the material is at least 1.3% below the desired composition, and is ground to a fineness of 85% through a 200 mesh sieve, the total quantity of sands removed as underflow from the rake is not a sufficient proportion of the total quantity to permit complete composition correction by the removal of silica. If, however, the material closely approaches the desired composition, finer grinding is preferably resorted to, but the dilution in the classifier equipment may be reduced to decrease the relative quantity of coarse particles separated for treatment. Therefore, I prefer to provide the additional quantity to be treated from the relatively coarser particles of those which pass through the 325 mesh screen, and by varying the tonnage so added to the sands, I am able to effect the control of composition which is the primary feature of the new method.

As will be seen more clearly in Fig. 2, this may be accomplished by providing a means to tap and withdraw a supply from the rake box before these particles have either precipitated to the bottom or have been carried out with the overflow. A convenient withdrawal apparatus comprises a pipe having perforations on its under side, and which extends horizontally substantially across the box a short distance above the rake elements. This pipe may be fixed in position, but it is preferably made adjustable in height, as by means of two elbow pipe fittings or a flexible hose connection, whereby the coarsest of the suspended particles are removed and added to the sands. This pipe connects with a pipeline provided with a valve to control the quantity of solids removed from time to time.

It will thus be seen that the classification apparatus described above makes it a very simple procedure to vary the relative quantities of the fine and coarse particles which constitute respectively the part which is not to be treated by froth flotation and the part which is treated to remove the excessive quantity of silica.

To regulate the actual tonnage withdrawn for treatment at any time, the operator has merely to take a complete sample of both the sands and the product withdrawn from the rake box for a specific interval of time; e. g., ten seconds, into a graduate and to determine the specific gravity by weighing. From this sample the total dry solids actually discharged in the ten-second interval may be used as the factor to determine the total tonnage that will actually be separated for any operating period. I have found it convenient to provide charts for the convenience of the operator, comprising parallel columns showing the relation between specific gravity and weight of dry solids, whereby the operator need not make a complete calculation for each sample. He can, therefore, regulate the total tonnage to be treated simply by varying the degree of opening of the valve in the withdrawal line which taps the rake box.

As a specific example, based upon actual operation in the treatment of 700 tons of original material a day, for the purpose of obtaining a constant final composition of 75.8% calcium carbonate, a constant flotation concentrate of 87% calcium carbonate, and rejects of 20% calcium carbonate, the division or split between the parts to be treated and those to form the untreated part are given in the following table. This table is based upon a variation in calcium carbonate in the original materials ranging from 68% to 75% calcium carbonate.

| CaCO₃ in rock | Percentage untreated | Percentage to be treated | Tons to be treated |
| --- | --- | --- | --- |
| 68 | 46.5 | 53.5 | 374 |
| 69 | 49.0 | 51.0 | 356 |
| 70 | 52.7 | 47.3 | 331 |
| 71 | 56.6 | 43.4 | 304 |
| 72 | 60.2 | 39.8 | 272 |
| 73 | 65.7 | 34.3 | 239 |
| 74 | 71.0 | 29.0 | 203 |
| 75 | 77.0 | 22.7 | 159 |

This table is intended to cover the common ranges in original raw material analysis of interest to most cement chemists, but for determining the relative quantity to be treated where the raw material is of either lower or higher value, the table will serve as a guide to make the necessary corrections. Exact calculations of tons to be treated may be made, however, whereby the chemist can control the final analysis exactly to a desired calcium carbonate value, from any original material and at any desired capacity. In the following formula, the factors to suit the conditions to be met are to be substituted for those assumed.

Therefore, to parallel the assumptions given above, and also the more complete "Table of relative quantities of treated and untreated materials", to be given hereinafter, it is assumed:

Calcium carbonate value of rock_____equals 72%
Concentrate to be segregated_____equals 87%
Reject value_____equals 20%
Final mixture analysis_____equals 75.8%
Daily capacity in raw stone_____equals 700 tons As the analysis of the fines, or the untreated part, varies from the original analysis due to differences in grindability of the constituents, allowance must be made. To use the actual variation, set forth in the table, it will be seen that with the specimen discussed the decrease was 2%, or 70% actual value. The value of the concentrate is arbitrarily fixed at 87%. Therefore, to combine the fines and concentrates to arrive at a value of 75.8%:

75.8% minus 70% equals 5.8 parts of fines.
87% minus 75.8% equals 11.2 parts of concentrate.
5.8 plus 11.2 equals 17.
Therefore:

$$\frac{11.2}{17}$$

equals 65.8% fines.

$$\frac{5.8}{17}$$

equals 34.2% concentrates.

The value of the cell feed has risen 2% and equals 74%.
The weight recovery by the cells equals—

$$\frac{\text{Feed minus Rejects}}{\text{Concentrates minus Rejects}} = \frac{74 \text{ minus } 20}{87 \text{ minus } 20} = 85.5\%$$

Again referring to Fig. 1, it will now be seen that the materials to be treated are preferably uniformly suspended in water by agitation in a blunger or turbo-mixer. The stream discharged from the mixer receives a small quantity of the collecting reagent, which may be oleic acid, and is then fed to flotation cells in which the frothing agent, which may be cresylic acid, makes the separation of the calcium values from the other constituents.

To obtain the greatest economy and capacity from the available equipment as well as to obtain a concentrate of a desired value, I prefer to subject the particles or "pulp" to more than one stage of froth flotation.

I have found that it is most satisfactory, for the tonnage and materials described above, to deliver the pulp first to four "rougher" cells, in which a sufficient quantity of reagents is employed to result in a continuous concentrate value of 87% calcium carbonate, as above described. The underflow from these cells will, therefore, include relatively high calcium values, and may then be treated serially in three "cleaner" cells. The froth from these cells is preferably so regulated that little recoverable calcium carbonate is present in the underflow from the final cell, and therefore the froth is of lower quality than that desired for the final concentrate. This froth is then preferably cleaned in a series of two "recleaner" cells, and after cleaning is then combined with that of the "rougher" cells, the total forming the final concentrate. The underflow from the recleaner cells contains recoverable calcium values and is also recombined continuously with the underflow from the rougher cells for further passage through the cleaner cells. For this service I have found that 44 inch cells of the well-known "Fagergren" type are satisfactory in function and capacity.

The concentrates so recovered are of relatively low density, and are preferably separately thickened to a relatively heavy slurry, whereby the water may be recovered and re-used by returning it to the classification apparatus. The purpose of this is to economize in reagents as they are not completely used, and further in that the circulating water is "softer" as if oleic acid is used as the collecting agent, calcium salts in the raw water are precipitated as calcium oleate. The water should also be separated from the rejects to recover the frothing agent, cresylic acid.

The thickened concentrates, or underflow, are preferably then combined continuously with the untreated fines and the stream delivered to a thickener of sufficient capacity to complete dewatering to normal slurry moisture content. This underflow, in the treatment described above, will be correct as to the calcium carbonate value. The tailings or rejects from the last of the three cleaner cells may be further segregated by means of a wet concentration table, when it is desired to recover desirable quantities of one of the other constituents. Thus, although wet concentration does not permit separation of the calcium and silica compounds, segregation of quartz, silicates of alumina, such as mica, and iron values are readily separable, and the iron, for instance, may be recovered and added to the final mixture. If the iron values occur in the form of oxides, the reagents described above may be employed to recover substantially all of them with the calcium values. In the form of sulphides, however, they are deposited with the residue and are recovered by concentration. Iron values so recovered are preferably subjected to further reduction to make them more suitable for burning.

The relation between water and dry solids influences the degree of classification, as increasing the dilution accelerates the precipitation or settling of the particles in the classification apparatus. The following table will, therefore, serve as a guide to indicate the degree of dilution in the various steps of the process. This table is based upon a division of 40% flotation cell feed and 60% of untreated fines, the division corresponding to a raw material having an original analysis of 72% calcium carbonate ground to 85% passing through a 200 mesh sieve, and with water temperature at about 60° F.

|  | Percent solids | Tons stone per day | Tons water per day | Dilutions |
| --- | --- | --- | --- | --- |
| 30 ft. hydro-separator feed | 20.0 | 700 | 1,267 | 1.81:1 |
| Hydro-separator overflow | 16.6 | 280 | 1,410 | 5.03:1 |
| Hydro-separator underflow | 55.0 | 520 | 426 | 0.82:1 |
| 20 ft. rake overflow | 15.0 | 100 | 568 | 5.68:1 |
| Rake sands | 75.0 | 105 | 35 | 0.33:1 |
| Withdrawal pipe | 43.0 | 315 | 416 | 1.32:1 |
| Concentrates | 16.5 | 330 | 1,660 | 5.02:1 |
| Concentrate 28 ft. thickener underflow | 59.2 | 330 | 228 | 0.69:1 |
| 80 ft. Final thickener feed | 27.4 | 610 | 1,638 | 2.68:1 |
| Final underflow | 66.6 | 610 | 305 | 0.50:1 |
| Rejects | 17.1 | 90 | 437 | 4.85:1 |
| Cell feed | 33.3 | 420 | 840 | 2.00:1 |

The above table gives the preferred dilutions, but these are not arbitrary, the proper degree of dilution being readily apparent when the fines are separated readily without an excess of water. If the separation is incomplete at any point, the operator merely adds additional water, so that the rate of settling is increased.

With the dilutions given and the recovery and re-use of the overflow water from the concentrate thickener, the total quantities of additional reagents necessary to produce a concentrate of 87% calcium carbonate are 0.6 lbs. of oleic acid and 0.1 lbs. of cresylic acid for each ton of solids delivered to the flotation cells. It will be realized that these quantities are added continuously, as the process is continuous, and that they are also influenced to the greatest extent by the analysis and nature of the material treated. The quantities are, therefore, to be considered as by way of example and the averages needed to treat the rock described above, and referred to in specific detail in a table to be given hereinafter.

As described above, the calcium carbonate value is a convenient and well-understood standard factor at each step of the process. Accordingly, for a more complete understanding of the invention, reference is made to the following table, in which this standard is given in detail as to percentages in the tons of materials available throughout the treatment. This table is, therefore, a more complete exposition of that first given, in that it shows the complete changes which take place throughout for raw materials which vary in analysis from 68% to 75% calcium carbonate. The table is also based upon a concentrate value of 87% and a reject value of 20%, these values arbitrarily being held constant regardless of the variation in the original analysis. The tonnages are established by a daily capacity of 700 tons of original material.

results in an average fineness of 72.5% minus, and 27.5% plus 325 mesh, for the specimens discussed, rocks having calcium carbonate values ranging up to 74.5% (at which value the quantity of cell feed equals the quantity of plus 325 mesh particles), require treatment of a part of the coarser fines which pass through the 325 mesh sieve in addition to the sands. For higher grade stones, such as that of 75% calcium carbonate, finer grinding should be practiced to decrease the quantity of sands to or below that desired for cell feed. The quantity of coarse particles precipitated and recovered for treatment can, however, be decreased by decreasing the dilution in the classification apparatus, but this obviously yields a coarser final product.

To treat rocks above the desired composition, the degree of grinding should be regulated similarly for the purposes of releasing the physical bonds, as described, and also to provide a final product of the desired fineness.

The relation between calcium carbonate and the other constituents of the final mixture resulting from the treatment above described can best be understood by specific reference to the total analysis in percentages and tons of calcium carbonate in a typical intermediate specimen. Bearing in mind that as it is the primary purpose with reference to each of the materials discussed above to eliminate excessive silica and to include therewith the uncombinable forms, it will also be recalled that alumina is likewise to be corrected, but to a lesser degree, and that the silica, iron-alumina ratio is also to be corrected.

Although the specimen chosen serves as an ex-

*Table of relative quantities of treated and untreated materials*

| | 68[1] | | 69[1] | | 70[1] | | 71[1] | | 72[1] | | 73[1] | | 74[1] | | 75[1] | |
|---|---|---|---|---|---|---|---|---|---|---|---|---|---|---|---|---|
| | % $CaCO_3$ | Tons | % $CaCO_3$ | Tons | % $CaCO_3$ | Tons | % $CaCO_3$ | Tons | % $CaCO_3$ | Tons | % $CaCO_3$ | Tons | % $CaCO_3$ | Tons | % $CaCO_3$ | Tons |
| Mill stream | 68.0 | 700 | 69.0 | 700 | 70.0 | 700 | 71.0 | 700 | 72.0 | 700 | 73.0 | 700 | 74.0 | 700 | 75.0 | 700 |
| Hydro overflow | 66.0 | 323 | 67.0 | 343 | 68.0 | 370 | 69.0 | 395 | 70.0 | 426 | 71.0 | 460 | 72.0 | 498 | 73.0 | 541 |
| Cell feed | 70.0 | 377 | 71.0 | 357 | 72.0 | 330 | 73.0 | 305 | 74.0 | 274 | 75.0 | 240 | 76.0 | 202 | 77.0 | 159 |
| Concentrates | 87.0 | 282 | 87.0 | 272 | 87.0 | 256 | 87.0 | 241 | 87.0 | 221 | 87.0 | 197 | 87.0 | 169 | 87.0 | 135 |
| Rejects | 20.0 | 95 | 20.0 | 85 | 20.0 | 74 | 20.0 | 64 | 20.0 | 53 | 20.0 | 43 | 20.0 | 33 | 20.0 | 24 |
| Final mixture | 75.8 | 605 | 75.8 | 615 | 75.8 | 626 | 75.8 | 636 | 75.8 | 647 | 75.8 | 657 | 75.8 | 667 | 75.8 | 676 |
| Cell weight recovery | 74.8 | 282 | 76.1 | 272 | 77.6 | 256 | 79.1 | 241 | 80.6 | 221 | 82.1 | 197 | 83.6 | 169 | 85.1 | 135 |
| $CaCO_3$ recovery | 92.8 | 245 | 93.4 | 236 | 93.9 | 223 | 94.3 | 210 | 94.8 | 192 | 95.2 | 171 | 95.7 | 147 | 96.1 | 117 |
| Overall weight recovery | 86.4 | 605 | 87.9 | 615 | 88.4 | 626 | 90.9 | 636 | 92.4 | 647 | 93.8 | 657 | 95.3 | 667 | 96.8 | 676 |
| Overall $CaCO_3$ recovery | 96.2 | 458 | 96.7 | 467 | 96.8 | 474 | 97.0 | 482 | 97.1 | 490 | 97.3 | 498 | 97.7 | 506 | 97.8 | 512 |
| Division: | | | | | | | | | | | | | | | | |
| Hydro overflow | 46.1% | | 49.0% | | 52.8% | | 56.5% | | 60.9% | | 65.7% | | 71.1% | | 77.3% | |
| Cell feed | 53.9% | | 51.0% | | 47.2% | | 43.5% | | 39.1% | | 34.3% | | 28.9% | | 22.7% | |

[1] Original rock percent $CaCO_3$.

It will be seen from the above that the analysis of the final mixture remains constant regardless of the original analysis which may vary widely as received from the quarry for treatment, and that the quantity of material treated; that is, "the cell feed", varies inversely as the original analysis varies, increasing as the calcium carbonate value decreases. It will also be clear that the total weight of the final mixture produced from an original 700 tons likewise decreases as the calcium carbonate value decreases.

As referred to before, it is desirable to include in the treated part all of the products coarser than 325 mesh fineness. Further, it is desirable to avoid varying the fineness of grinding for moderate ranges in calcium carbonate content. Therefore, as grinding to 85% through 200 mesh cellent example with respect to silica correction, the alumina content and the silica, iron-alumina ratio, as well as the iron-alumina ratio were each substantially satisfactory. Therefore, only a limited change in these latter relations is necessary or desirable, and accordingly the utility of the process in making a radical separation of alumina is not as apparent with this as with other specimens.

However, if in the following table reference is made to the analysis of the concentrates, it will be seen that the total alumina has been decreased from 5.34% to 1.76%. Therefore, if it is desirable to make a cement low in tri-calcium aluminate, the separation of the original materials into treated and untreated parts can be made to control alumina at this point similarly to the control of the silica content, the control of silica being completed by returning preferably quantities of the finer concentrates recovered by the concentration table. Final correction to improve the iron-alumina ratio may also be made by adding or returning quantities of iron compounds, whereby the tri-calcium aluminate content of the cement will be further decreased.

*Complete correction of 700 tons of 72.2% calcium carbonate rock*

|  | Mill stream | Hydro over-flow | Cell feed | Concentrates | Rejects | Final mixture |
|---|---|---|---|---|---|---|
| Total tons | 700.00 | 460.00 | 240.00 | 195.00 | 45.00 | 655.00 |
| Total tons CaCO₃ | 505.40 | 327.00 | 178.80 | 169.60 | 9.00 | 496.00 |
| Tons SiO₂ | 96.90 | 64.80 | 32.10 | 8.80 | 23.30 | 73.60 |
| Tons Fe₂O₃ | 11.60 | 7.03 | 4.57 | 3.33 | 1.24 | 10.36 |
| Tons Al₂O₃ | 37.38 | 25.90 | 11.48 | 3.43 | 8.05 | 29.30 |
| Tons MgCO₃ | 46.40 | 31.10 | 15.30 | 13.4 | 1.90 | 44.50 |
| Grade (%) CaCO₃ | 72.20 | 71.10 | 74.50 | 87.00 | 20.00 | 75.80 |
| Grade (%) SiO₂ | 13.84 | 14.09 | 13.38 | 4.50 | 51.80 | 11.25 |
| Grade (%) Fe₂O₃ | 1.66 | 1.53 | 1.90 | 1.71 | 2.74 | 1.58 |
| Grade (%) Al₂O₃ | 5.34 | 5.63 | 4.77 | 1.76 | 17.89 | 4.48 |
| Grade (%) MgCO₃ | 6.62 | 6.76 | 6.38 | 6.87 | 4.22 | 6.80 |
| 325 mesh fineness (%) | 72.50 | 96.10 | 27.30 | 31.20 | 7.00 | 77.00 |

In explanation of the above, it is especially to be noted that the percentage analysis of the final mixture is an ideal composition for the manufacture of Portland cement. It will also be seen that the actual fineness has been increased to a point where the mixture is especially suitable for burning to clinker, with this material, the fineness of 77% passing through the 325 mesh sieve corresponds to about 91% passing a 200 mesh sieve. It will also be realized that the rejects are of relatively little value as they involve only 9 tons of calcium carbonate out of an original total of 505.4 tons. The total quantity of iron discarded, namely 1.24 tons, would not make concentration of the rejects essential to economical operation, especially in view of the decrease in alumina, but it will be realized that the iron values can be added to the mixture when the treatment above described has been based especially upon silica elimination and when the iron-alumina ratio is such that the mixture would result in a cement of higher tri-calcium aluminate value than desired. It will also be understood that if the rejects were further pulverized, either before or after table concentration, substantially all of the loss of calcium values could be eliminated by returning the products to the flotation cells. The concentrates discussed above were arbitrarily held to a value of 87% calcium carbonate. A constant value is desirable for convenience in control and may cover a range of several percent in raw material analysis. This value may be made lower when the materials are considerably below composition, or higher when the calcium value is high, to obtain the highest capacity and economy from the available equipment.

It will be apparent, from the tables and the formula given above, that widely divergent materials may be treated to produce various final mixtures. For example, if both low- and high grade materials are available, the former may be treated to produce a final mixture only partially corrected as to analysis and ratios, but preferably to a degree which will permit the elimination of undesirable forms of constituents such as silica. The latter, even if above the desired composition in calcium carbonate value, may be treated to produce a relatively pure concentrate and final product, and to eliminate undesirable constituents or forms. These two products may be then combined to produce the ultimate mixture. Similarly, a natural corrective can be added to a partially corrected inferior material, particularly when the value of the combinable quantities of the constituent occurring in excess is greater than the value of the natural corrective.

It is also to be understood that in many localities, the calcium carbonate, rather than the silica, is the constituent occurring in excess, and that quantities of this constituent can likewise be eliminated to make the desired correction. Some specimens of such stones contain coarse quartz particles which should be eliminated, as well as the excessive quantity of calcium carbonate, the fine silicas being combined in the final mixture.

In applying the new method to dry process plants, I have found that improved results may be had by limiting the degree of raw grinding to an extent that additional grinding of the quantities to be treated is necessary. Thus, the materials are ground in a dry state to a degree at which substantialy all of the silica and particularly quartz is released from lime particles or may be released by moderate additional grinding. These products are then air separated to segregate the fine and coarse particles. The coarse particles are then preferably suspended in water and ground in a wet mill to complete the separation of the minerals. This practice expedites the reaction of the collecting reagent upon the lime particles and thereby simplifies the separation. After grinding, the material is treated by flotation, in the manner described above, and then the concentrate or concentrates are dewatered by thickening, filtering or a combination of both, and then dried prior to combination with the fine products previously air separated.

I claim:

1. The method of treating lime-bearing cement raw materials containing an undesirable quantity of at least one constituent and in which the calcium carbonate value varies from time to time as received for treatment, which comprises separating from each material the sands from the fine particles, separating an additional quantity of the coarser particles from the fines and combining them with the sands, subjecting the combined coarse particles to froth flotation, conducting the flotation operation so that the concentrate is maintained substantially at a desired calcium carbonate value and the rejects include the undesirable quantity of said constituent, combining the concentrate from the flotation operation with the untreated fines, the relative quantity of the part of each material so treated being such that the combination of said concentrate with the untreated fines will provide a mixture of the desired calcium carbonate value and maintaining this value substantially constant continuously by varying the quantity of the coarser particles separated from the fines and added to the sands, whereby the combined quantity is varied inversely as the calcium carbonate value of the materials varies in the materials received.

2. The method of treating lime-bearing cement raw materials containing an undesirable quantity of at least one constituent, including particles thereof too coarse to combine properly in the process of burning to clinker, and in which the calcium carbonate content varies from time to time as received for treatment, which comprises separating from each material the sands from the fine particles, separating an additional quantity of the coarser particles from the fines and combining them with the sands, subjecting the combined coarse particles to froth flotation, conducting the flotation operation so that the concentrate is maintained substantially at a desired calcium carbonate value and the rejects include the undesirable quantity of said constituent, combining the concentrate from the flotation operation with the untreated fines, the relative quantity of the part of each material so treated being such that the combination of said concentrate with the untreated fines will provide a mixture of a desired fineness and of a desired calcium carbonate value, and maintaining this value substantially constant continuously by varying the total quantity of the coarse particles so treated inversely as the calcium carbonate varies in the raw materials received.

3. The method of treating lime-bearing cement raw materials containing an undesirable quantity of at least one constituent and in which the calcium carbonate value varies from time to time as received for treatment, which comprises grinding the materials at least to a degree at which the physical bonds are substantially released between the constituents and the total quantity of the coarse particles of the constituent occurring in undesirable quantity is less than said undesirable quantity, separating from each material the sands from the fine particles, separating an additional quantity of the coarser particles from the fines and combining them with the sands, subjecting the combined coarse particles to froth flotation, conducting the flotation operation so that the concentrate is maintained substantially at a desired calcium carbonate value and the rejects include the undesirable quantity of said constituent, combining the concentrate from the flotation operation with the untreated fines, the relative quantity of the part of each material so treated being such that the combination of said concentrate with the untreated fines will provide a mixture of the desired calcium carbonate value and maintaining this value substantially constant continuously by varying the quantity of the coarser particles separated from the fines, and added to the sands, whereby the combined quantity is varied inversely as the calcium carbonate value of the materials varies in the materials received.

4. The method of treating lime-bearing cement raw materials containing an undesirable quantity of at least one constituent and in which the calcium carbonate value varies from time to time as received for treatment, which comprises grinding the materials at least to a degree at which the physical bonds between the constituents are substantially released, and the total quantity of the coarse particles of the constituent occurring in undesirable quantity is less than said undesirable quantity, maintaining substantially the same degree of grinding over a range of said materials of variable calcium carbonate value, separating from each material the sands from the fine particles, separating an additional quantity of the coarser particles from the fines and combining them with the sands, subjecting these combined coarse particles to froth flotation, conducting the flotation operation so that the concentrate is maintained substantially at a desired calcium carbonate value and the rejects include the undesirable quantity of said constituent, combining the concentrate from the flotation operation with the untreated fines, the relative quantity of the part of each material so treated being such that the combination of said concentrate with the untreated fines will provide a mixture of the desired calcium carbonate value and maintaining this value substantially constant continuously by varying the quantity of the coarser particles separated from the fines, and added to the sands, whereby the combined quantity is varied inversely as the calcium carbonate value varies in the materials received.

5. The method of treating lime-bearing cement raw materials containing an undesirable quantity of at least one constituent and in which the calcium carbonate value varies from time to time, as received for treatment, which comprises separating each material as received into coarse and fine parts, subjecting the coarse part to froth flotation, conducting the flotation operation so that the concentrate is maintained substantially at a desired calcium carbonate value and the rejects include the undersirable quantity of said constituent, and a desirable quantity of at least one other constituent, combining both of said concentrates with the untreated fines, concentrating said last named quantity, the relative quantity of the coarse part of each material so treated being such that the combination of both concentrates with the untreated part will provide a mixture of a desired calcium carbonate value, and maintaining this value substantially constant continuously by varying the quantity of the coarse part relatively to the fine part inversely as the calcium carbonate value of the materials vary in the materials received and varying the quantity of the second concentrate so that the mixture will be of said desired final analysis.

6. The method of preparing a cement raw material mixture from argillaceous limestones containing the constituents calcium carbonate, silica, alumina and iron in which at least one of said constituents occurs in excessive quantity and in which the calcium carbonate value varies from time to time as received for treatment, which comprises grinding the materials at least to a degree at which the physical bonds between the constituents are substantially released, separating each material as received into coarse and fine parts, subjecting the coarse part to froth flotation to segregate the constituent calcium carbonate from the remaining constituents, table concentrating said remaining constituents to separate them, combining quantities of at least one of the constituents segregated by flotation and at least one segregated by table concentration with the untreated fines, the relative quantity of the coarse part of each material so treated being such that these combined materials will be of a desired final analysis, and maintaining the final analysis constant by increasing the relative quantity of the treated part to the untreated part as the quantity of the constituent occurring in excess increases and decreasing it as the quantity of said constituent decreases.

7. The method of preparing a cement raw material mixture from argillaceous limestones containing the constituents calcium carbonate, silica, alumina and iron in which at least one of said constituents occurs in excessive quantity and in which the calcium carbonate value varies from time to time as received for treatment, which comprises grinding the materials at least to a degree at which the physical bonds between the constituents are substantially released, separating each material as received into coarse and fine parts, subjecting the coarse part to froth flotation to segregate the constituent calcium carbonate from the remaining constituents, table concentrating said remaining constituents to separate them, combining quantities of at least one of the constituents segregated by flotation and at least one segregated by table concentration with the untreated fines, the quantities of each of the constituents being so combined that the analysis of the mixture will be correct as to proportions and ratios, and maintaining the analysis constant by increasing the relative quantity of the treated part to the untreated part as the quantity of the constituent occurring in excess increases and decreasing it as the quantity of said constituent decreases.

8. The method of preparing a cement raw material mixture from argillaceous limestones containing the constituents calcium carbonate, silica, alumina and iron, in which the silica and alumina occur in excessive quantities and in which the calcium carbonate value varies from time to time as received for treatment, which comprises grinding the materials at least to a degree at which the physical bonds between the constituents are substantially released, separating each material into coarse and fine parts, subjecting the coarse part to froth flotation to segregate the constituent, calcium carbonate, from the remaining constituents, table concentrating these constituents to segregate the iron from the silica and alumina, discarding the silica and alumina and combining the concentrated calcium carbonate and iron with the untreated fines, the relative quantity of the coarse particles so treated being such that the combined particles will be of a desired final analysis, and maintaining the final analysis substantially constant by increasing the quantity of the treated part as the excessive quantities of silica and alumina increases, and decreasing it as the quantities decrease.

9. The method of treating inferior cement raw materials which vary in analysis as received for treatment, to derive continuously therefrom an ultimate mixture of a desired constant analysis, which comprises controlling the ultimate analysis by treating a variable quantity of material by froth flotation, the quantity so treated being varied inversely as the calcium value varies in the material received, by first pulverizing all of the materials to the same degree of fineness and sufficiently to break the physical bond between the calcium, silica, alumina and iron compounds, classifying the particles according to size to segregate all of the sands, to permit the rejection of uncombinable forms of silica, separating from the remaining fines a sufficient quantity of the coarser particles to include the undesirable quantities of the constituents occurring in excess in the original material, treating the combined sands and coarser particles by froth flotation to segregate the calcium carbonate, silica and alumina, combining the calcium carbonate with the remaining fines, discarding the silica and alumina, controlling the quantity so segregated from the final mixture and thereby the analysis thereof by increasing the quantity of coarser particles added to the sands prior to flotation when the calcium value of the material decreases and decreasing the quantity when the calcium carbonate value increases.

10. The method of treating lime-bearing cement raw materials containing an undesirable quantity of at least one constituent and in which the calcium carbonate value varies from time to time as received for treatment, to derive continuously therefrom a mixture of a desired calcium carbonate value, which comprises suspending the materials in a hydraulic classifier, permitting the sands to settle therein, causing the finest particles to over-flow, removing the sands as under-flow, removing a quantity of material of intermediate fineness and adding these to the sands, subjecting this combined quantity to froth flotation to segregate the constituent calcium carbonate from the other constituents, the relative quantity of each material so treated being such that combining one of said segregated quantities with the untreated finest particles will provide a mixture of a desired calcium carbonate value, and maintaining this value constant continuously by varying the quantity of particles of intermediate fineness added to the sands so that the total quantity of the treated part increases as the quantity of the undesirable constituent increases and decreases as the quantity of the undesirable constituent decreases in each material received.

11. The method of treating lime-bearing cement raw materials containing an undesirable quantity of at least one constituent and in which the calcium carbonate value varies from time to time as received for treatment, which comprises separating each material into coarse and fine parts, subjecting the coarse part to froth flotation to concentrate the constituent, calcium carbonate, from the remaining constituents, separately thickening the calcium carbonate to recover reagents with the water, the relative quantity of the part of each material so treated being such that combining said concentrate with the untreated fine part will provide a mixture of the desired calcium carbonate value, maintaining this value substantially constant by varying the quantity of the coarse part inversely as the calcium carbonate value varies in each material, mixing the concentrate and untreated fine particles and de-watering the mixture to normal cement slurry moisture content.

CHARLES H. BREERWOOD.